United States Patent [19]
Chase

[11] Patent Number: 6,120,712
[45] Date of Patent: Sep. 19, 2000

[54] ACCUMULATOR HEAD BLOW MOLDING MACHINE AND METHOD

[75] Inventor: Michael C. Chase, Dover, Pa.

[73] Assignee: Graham Engineering Corporation, York, Pa.

[21] Appl. No.: 09/074,528

[22] Filed: May 7, 1998

[51] Int. Cl.⁷ .............................. B29C 49/56; B29C 49/78
[52] U.S. Cl. ..................... 264/40.5; 264/523; 264/540; 425/150; 425/167; 425/532; 425/541; 425/451.2
[58] Field of Search .................................... 264/40.5, 523, 264/540; 425/150, 532, 541, 135, 138, 167, 451.2

[56] References Cited

U.S. PATENT DOCUMENTS

| | | | |
|---|---|---|---|
| 3,344,470 | 10/1967 | Hufford . | |
| 3,767,341 | 10/1973 | Siebelhoff et al. | 425/150 |
| 3,807,929 | 4/1974 | Moore | 425/387 B |
| 3,848,525 | 11/1974 | Kent et al. | 100/48 |
| 4,148,203 | 4/1979 | Farazandeh et al. | 72/21 |
| 4,150,080 | 4/1979 | Hagen | 264/523 |
| 4,184,827 | 1/1980 | von Hermann et al. | 425/135 |
| 4,447,198 | 5/1984 | Long et al. | 425/140 |
| 5,238,389 | 8/1993 | Brandau et al. | 425/522 |
| 5,250,238 | 10/1993 | Keifer et al. | 264/40.5 |
| 5,269,985 | 12/1993 | Kanou et al. | 264/40.5 |
| 5,368,462 | 11/1994 | Keifer et al. | 425/150 |
| 5,634,398 | 6/1997 | McGee et al. | 100/43 |
| 5,662,842 | 9/1997 | Sadr et al. | 264/40.5 |

FOREIGN PATENT DOCUMENTS

| | | |
|---|---|---|
| 0 481 259 a1 | 4/1992 | European Pat. Off. . |
| 0 629 455 A1 | 12/1994 | European Pat. Off. . |
| 0 693 358 A1 | 1/1996 | European Pat. Off. . |
| 0 727 295 A3 | 8/1996 | European Pat. Off. . |
| 2003440 | 11/1969 | France . |
| 23 38 483 | 2/1975 | Germany . |
| 33 16 285 A1 | 11/1984 | Germany . |
| 42 23 314 A1 | 1/1994 | Germany . |
| 61-261017 | 11/1986 | Japan . |
| 020006114 | 1/1990 | Japan . |
| 1196536 | 6/1970 | United Kingdom . |
| 2087300 | 5/1982 | United Kingdom . |
| WO 88/07572 | 10/1988 | WIPO . |

OTHER PUBLICATIONS

"MACO® EZ Position Control", 1640–BD–043–0–00, Feb. 1997, Barker–Colman Company, 4 pages.

"EZ–Pro Setup", 1640–IN–054–0–00, Undated, Barber–Colman Company, 34 pages.

*Primary Examiner*—Mathieu D. Vargot
*Attorney, Agent, or Firm*—Thomas Hooker, P.C.

[57] ABSTRACT

An accumulator-type blow molding machine includes hydraulic cylinders for closing mold parts on platens and a control system for valves flowing hydraulic fluid to the cylinders. The control system calculates the desired position of one platen from the measured position of the other platen and generates work output signals accordingly.

18 Claims, 3 Drawing Sheets

ACCUMULATOR HEAD BLOW MOLDING MACHINE AND METHOD

FIELD OF THE INVENTION

The present invention relates to blow molding machines with hydraulic closing cylinders and an electronic system for controlling movement of mold parts from an open position to a closed position, and to related methods.

DESCRIPTION OF THE PRIOR ART

Prior blow molding machines with hydraulic closing cylinders use separate electronic controls for independently monitoring and moving each platen from an open position to a closed position where mold parts on the platens capture a parison and engage each other. These controls each include an electronic controller which receives a platen location input from a linear transducer and compares the input to a predetermined time/distance closing path stored in memory to generate an output signal. The output signal is applied to a hydraulic valve to control the flow of hydraulic fluid to one or more hydraulic closing cylinders for the platen. The cylinders receive hydraulic fluid as required to move the platen and mold part along the programmed time/distance closing path.

Blow molding machines with hydraulically closed platens and mold parts include hydraulic and mechanical systems for each mold part. These systems effect the actual closing paths for the parts. The performance of the hydraulic systems and the mechanical systems may change during the production life of the blow molding machine. For instance, the mechanical systems include bearings supporting the platens. Bearing wear may increase resistance to platen movement and effect the actual closing path of the platen. Degradation of the hydraulic system may change hydraulic resistance over time, altering flow to the closing cylinders and altering the actual closing path of the platen. Also, the hydraulic lines used to flow hydraulic fluid to close one platen may differ in length and capacity from corresponding lines used to flow hydraulic fluid to close the other platen.

Changes in these systems can alter the ability of a conventional electronic control to close the platen and mold part along a predetermined time/distance closing path. For instance, in a blow molding machine where mold parts must be closed exactly identically along mirror image time/distance closing paths the wear in one platen mechanical system may be more severe than the wear of the other platen mechanical system. The differences in wear can result in unequal resistance to platen movement with resultant unequal closing movement of the mold parts. Likewise, unequal changes in hydraulic resistance can result in unequal closing of the mold parts.

Improper closure of the mold parts because of non-uniform changes in the mechanical and hydraulic systems adversely effects blow molding and can lead to parison collapse, parison rupture and possible undesired impact between the mold parts. Failure to control closing of the mold accurately during the production life of the blow molding machine may result in a mold half moving past the center parting plane and injuring a blow pin or other auxiliary equipment. To compensate for these system changes over time, the blow molding machine must be periodically shut down and the control system re-calibrated.

The foregoing problems are particularly acute in large accumulator head blow molding machines where the mold parts are conventionally closed by hydraulic cylinders along relatively long closure strokes and it is necessary that both mold parts close along predetermined closure paths, independent of the wear of the mechanical and hydraulic systems of the platens.

SUMMARY OF THE INVENTION

The invention is an improved blow molding machine of the type where master and slave platens and mold parts on the platens are closed by hydraulic cylinders. In response to a triggering event appropriate hydraulic fluid is flowed to the hydraulic cylinders for the master platen by a control system which receives a master platen location input from a linear transducer attached to the platen and compares the input to a predetermined time/distance closing path for the master platen stored in memory. The resultant output signal activates a hydraulic valve to flow appropriate hydraulic fluid to the cylinders closing the master platen. In this way, the master platen is moved from the opened to closed positions along the predetermined time/distance closing path.

The control system receives a slave platen location input from a linear transducer attached to the slave platen and compares this input to a predetermined slave platen location based on the location of the master platen and stored in memory. The predetermined slave platen location may be stored in memory or may be determined by a predefined algorithm or function. The resultant output signal activates a second hydraulic valve to flow appropriate hydraulic fluid to the cylinders closing the slave platen. The closing path for the slave platen may be a mirror image of the closing path for the master platen or the closing path of the slave platen may differ from the closing path of the master platen, depending upon the requirements of the blow molding operation.

The master-slave control system of the improved blow molding machine has a number of advantages over the separate electronic controls that independently monitor and move the platens of known blow molding machines. The closing path of each platen can be individually defined to meet specific mold requirements. The control system automatically adjusts mold closing for drive system wear, assuring accurate closing of the mold throughout the production life of the blow molding machine. The adjustments made by the master-slave control system during the production life of the improved machine are transparent to the operation of the machine and do not require the machine to be shut down for re-calibration of the control system.

Other objects and features of the invention will become apparent as the description proceeds, especially when taken in conjunction with the accompanying drawings illustrating the invention, of which there are three sheets and one embodiment.

DESCRIPTION OF THE PREFERRED EMBODIMENT

Figure 1:
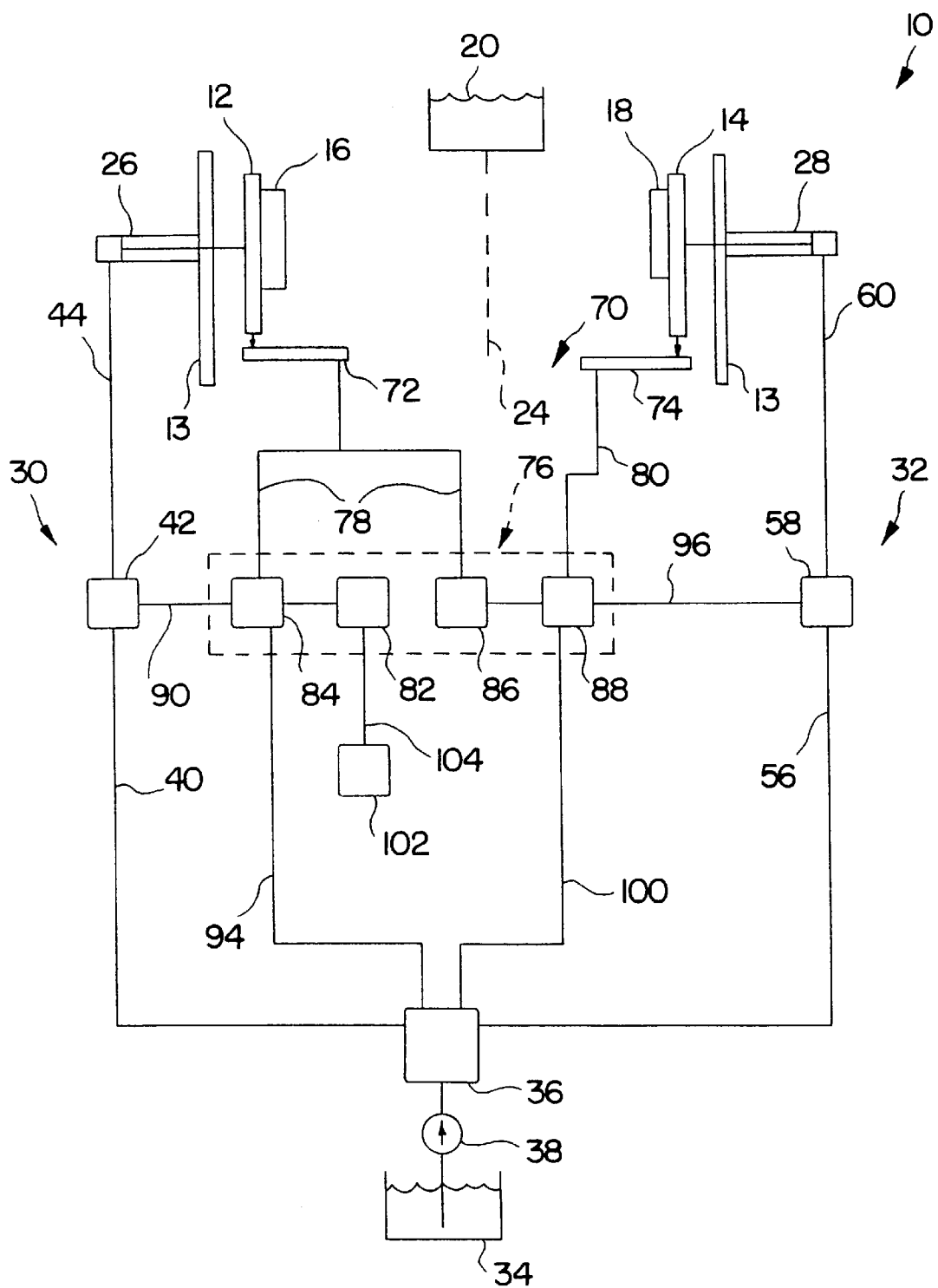
FIG. 1 is a schematic diagram of an accumulator type blow molding machine.

Accumulator head blow molding machine 10 includes a pair of spaced mold platens 12 and 14 mounted on frame members 13. Mold parts 16 and 18 are mounted on the front faces of platens 12 and 14 with suitable mold recesses formed in the front faces of the mold parts. The die of accumulator-type parison extrusion head 20 extrudes a parison 22 between the mold sections 16 and 18. Parting plane 24 defined by the location of the front faces of the mold parts 16 and 18 when the mold is fully closed may lie on the axis of head 20. One or more high pressure hydraulic cylinders 26, 28 are connected to the rear faces of the platens and are used to move platens 12 and 14 and the mold parts on the platens from the open position shown in FIG. 1 to the fully closed position shown in FIG. 6. In a large accumulator head blow molding machine, as many as four high pressure cylinders 26, 28 may be used to close each platen and mold section. Each cylinder is mounted on a frame member 13 with the piston rod of the cylinder engaging the rear face of the platen as illustrated. The platens are retracted from the closed position to the open position by conventional small diameter return cylinders (not illustrated). Lines flowing hydraulic fluid displaced from cylinders 26 and 28 during extension of the cylinders are conventional and are not illustrated.

Each of the platens 12 and 14 is individually driven by a hydraulic drive system 30, 32 respectively. Master drive system 30 moves master platen 12 and supported mold part 16 from the open to the closed position along a defined closing path and slave drive system 32 moves slave platen 14 and supported mold part 18 from the open to the closed position along a defined closing path. Each drive system 30, 32 flows hydraulic fluid from a hydraulic fluid reservoir 34 to the hydraulic cylinder 26, 28 associated with each platen. Master drive system 30 and slave drive system 32 include in common a conventional blocking valve 36 and a system hydraulic pump 38. System pump 38 pumps the hydraulic fluid from reservoir 34 through each of the drive systems 30, 32. If desired, each drive system 30, 32 can be provided with its own pump. The output from the system pump flows through the blocking valve 36. Blocking valve 36 is normally open. Closing blocking valve 36 shuts off fluid flow to the hydraulic cylinders 26, 28 and stops movement of the platens.

Master drive system 30 includes a hydraulic line 40 connected between the output of blocking valve 36 and a proportional hydraulic valve 42. The output of valve 42 is connected to the extension input port of each cylinder 26 through line 44. Slave drive system 32 is preferably like master drive 30 and includes a hydraulic line 56 connected between the output of blocking valve 36 and a proportional hydraulic valve 58. The output of valve 58 is connected to the extension input port of each cylinder 28 through line 60.

Blow molding machine 10 includes a conventional high pressure auxiliary system (not shown) to apply high pressure hydraulic fluid to the cylinders 26, 28 for applying clamping pressure when the mold is fully closed. The high pressure auxiliary system includes a high pressure hydraulic pump and valves to connect the high pressure system to the cylinders. If desired, one hydraulic pump can be used in place of the individual high pressure and system pumps.

Movement of the platens by the drive systems is controlled by a control system 70. Control system 70 includes horizontal transducers 72 and 74, an electronic controller 76 and a plurality of signal leads connecting the control system to the drive systems and blocking valve.

Linear transducers 72 and 74 are each mounted on the frame of machine 10. Linear transducer 72 is connected to platen 12 to generate a signal indicative of the distance between the master platen and parting plane 24. For instance, when the molds are fully opened the distance is at a maximum and when the molds are closed and in contact the distance is at a minimum. Linear transducer 74 is connected to platen 14 to generate a signal indicative of the distance between the slave platen and parting plane 24. The output of linear transducer 72 is connected to controller 76 through lead 78. The output of linear transducer 74 is connected to controller 76 through lead 80.

Electronic controller 76 includes a master memory unit 82, a master calculation unit 84, a master/slave calculation unit 86 and a slave calculation unit 88. Lead 90 connects master calculation unit 84 to proportional hydraulic valve 42 and lead 94 connects master calculation unit 84 to blocking valve 36. Lead 96 connects slave calculation unit 88 to proportional hydraulic valve 58 and lead 100 connects slave calculation unit 88 to blocking valve 36. Electronic controller 76 may be a programmable logic controller.

A switch 102 is connected to controller 76 by lead 104. Actuation of switch 102 starts the closing of mold platens 12 and 14 and signals the control system to monitor closing of the mold platens. During simultaneous closing of mold platens 12 and 14, control system 70 assures that each platen is closed accurately along the closing path of the platen as stored in master memory unit 82 for master platen 12 and calculated in master/slave calculation unit 86 for slave platen 14, despite mechanical wear and changes in hydraulic resistance during the operating life of the blow molding machine.

As each platen is closed the linear transducer 72, 74 for the platen generates a signal indicating the distance of the platen away from the parting plane 24. The master calculation unit 84 compares the actual distance of master platen 12 from the parting plane to the desired distance of master platen 12 from the parting plane, as stored in memory unit 82, and generates a voltage output signal for the master drive system proportional hydraulic valve 42. If desired, additional signal processing can be accomplished between master calculation unit 84 and hydraulic valve 42. For instance, a signal correction unit (not shown) may modify the output signal to correct for output nonlinearities of the proportional hydraulic valve.

Master/slave calculation unit 86 takes the measured position of master platen 12 from the parting plane and calculates the desired corresponding position of slave platen 14 from the parting plane. The calculation of position of platen 14 can be by mathematical algorithm whereby the position of slave platen 14 is a function of the position of master platen 12 programmed into master/slave calculation unit 86. A look-up table could also be used, whereby corresponding positions of slave platen 14 are stored with positions of master platen 12 in a prestored table in master/slave calculation unit 86.

Slave calculation unit 88 compares the actual distance of slave platen 14 from the parting plane to the desired distance of slave platen 14 from the parting plane, as calculated by master/slave calculation unit 86, and generates a voltage output signal for the slave drive system proportional hydraulic valve 58. Like the master drive system, additional signal processing (not shown) can be accomplished between slave calculation unit 88 and hydraulic valve 58. Valve 58 flows an appropriate volume of hydraulic fluid to each cylinder 28 through line 60.

After the two platens 12 and 14 are moved to the fully closed position by hydraulic fluid flowed through valves 42 and 58, PLC 76 actuates the high pressure actuation system to pressurize the hydraulic fluid in pressure cylinders 26 and 28 and generate a high clamp pressure between the two mold parts 16 and 18.

Figure 2:
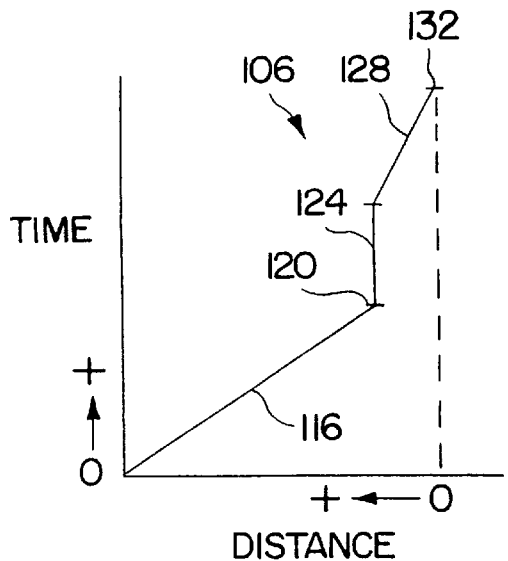
FIG. 2 is a graph of a time/distance closing path for a master platen.
Figure 3:
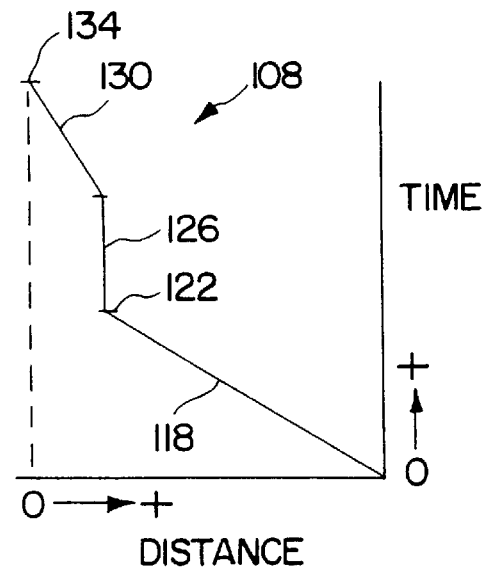
FIG. 3 is a graph of a time/distance closing path for a slave platen.
Figure 4:
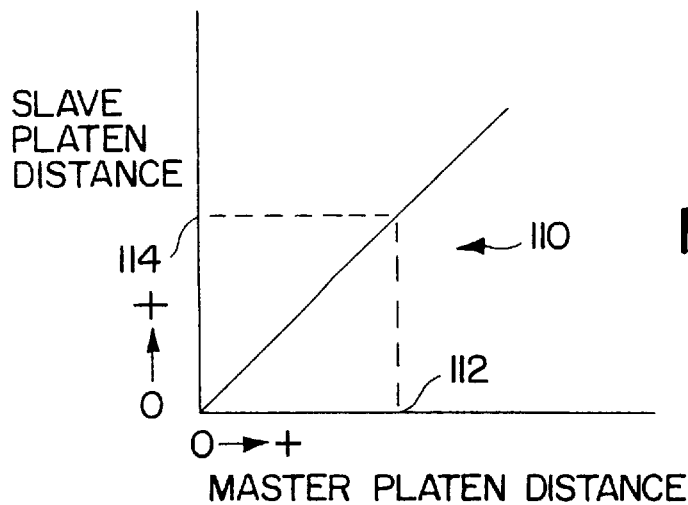
FIG. 4 is a graph of a closing path for a slave platen as a function of the position of the master platen.

Each platen is moved from the open position to the closed position along a defined time/distance path. FIG. 2 illustrates a time/distance closing path 106 for master platen 12 and FIG. 3 illustrates a time/distance closing path 108 for slave platen 14. Closing path 108 is determined by calculating the desired position of the slave platen 14 for each corresponding position of the master platen 12 along path 106. Closing path 108 may be determined by a function 110 relating the position of master platen 12 with a desired corresponding position of slave platen 14. For instance, as shown in FIG. 4, when master platen 12 is positioned at a distance 112 from the parting plane, slave platen 14 should be positioned at a distance 114 from the parting plane. By modifying the relationship 110, different closing paths 108 for slave platen 14 can be realized. The platens close simultaneously along their respective paths. The closing paths may differ, depending upon the requirements of the particular blow molding operation performed by machine 10.

A linear function 110 is illustrated where the positions of the slave platen is directly proportional to the positions of the master platen. Other non-linear functions are contemplated. For instance, the slave platen may have a longer close path and may close at a different speed than the master platen.

A cycle of operation of accumulator-type blow molding machine 10 will now be described.

The cycle of operation begins with the two mold platens 12 and 14 in the fully opened position and molten resin accumulating in head 20. The article molded during the prior cycle has been withdrawn from between the open mold parts 16 and 18.

A cycle is started by actuation of switch 102, which may occur after removal of a previously molded article from between the molds to generate a signal. The signal is transmitted to electronic controller 76 by lead 104. The controller then moves master platen 12 toward the plane 24. Controller 76 moves platen 12 inwardly from the open position to the closed position along rapid close portion 116 of the time/distance path 106 shown in FIG. 2. While master platen 12 is moving toward the parting plane, master/slave calculation unit 86 calculates the desired corresponding position of slave platen 14. Controller 76 moves slave platen 14 inwardly along rapid close portion 118 of the calculated time/distance path 108 shown in FIG. 3. During movement along portions 106 and 108 of the paths valves 42, 58 flow closing hydraulic fluid rapidly to the hydraulic cylinders and move the platens 12 and 14 in from the fully opened positions to respective preclose positions 120 and 122 along paths 106 and 108. The platens may be moved to the preclose positions at a rate of 1,200 inches per minute. At the preclose positions the inner faces of mold parts 16 and 18 are spaced apart a distance slightly greater than the diameter of the parison 22 to be extruded by head 20. See FIG. 5. The platens are then dwelled for an interval by closing valves 42 and 58. See dwell portions 124 and 126 of paths 106 and 108.

Figure 5:
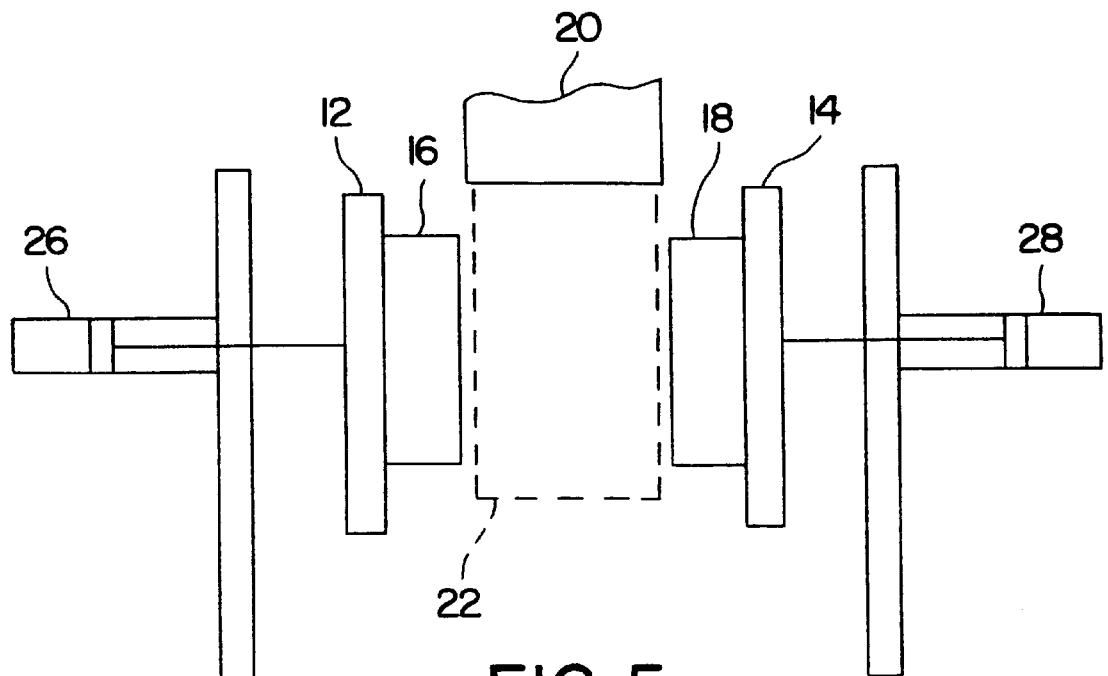
FIGS. 5 and 6 are schematic diagrams showing the molding machine in the preclose and closed positions, respectively.

With the mold parts in the preclose positions, as shown in FIG. 5, the accumulator head 20 extrudes parison 22 freely between the mold parts. After extrusion, controller 76 opens valve 42 sufficiently to move master platen 12 and mold part 16 inwardly from the preclose position along path portion 128 to a position shortly before the fully closed position. Simultaneously, controller 76 calculates the corresponding desired position of slave platen 14 and opens valve 58 as needed to move slave platen 14 and mold part 18 inwardly from the preclose along path portion 130 to a position shortly before the fully closed position. During this portion of the cycle, the mold parts may be moved together at approximately one-half full closure speed or at a rate of about 600 inches per minute. Closure at this speed assures that contact between the mold parts and the parison does not tear the parison and that the parison properly conforms to the cavities in the mold parts. Once the mold parts have been closed to within a short distance before full closure, the controller slows final closure to a rate of about 120 inches per minute in order to avoid impact injury to the mold parts on closing and to assure proper control of parison pinch-off by the mold parts.

Figure 6:
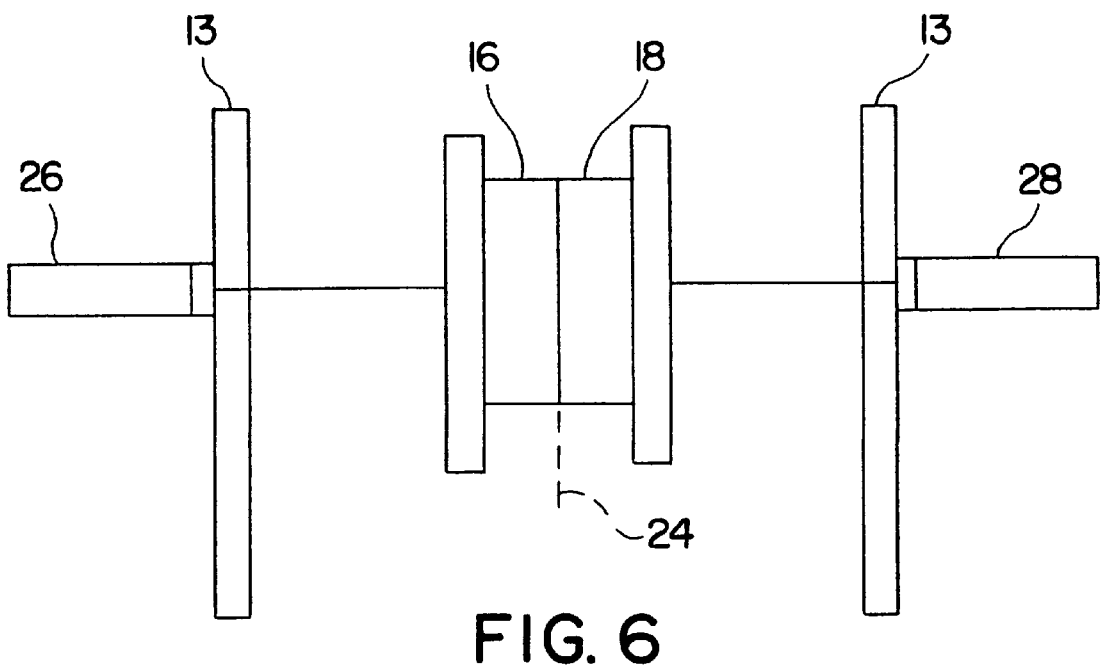

With the molds fully closed at positions 132 and 134 as shown in FIGS. 2, 3 and 6 and the parison captured in the cavity between the mold parts, the controller actuates the high pressure auxiliary system to increase the pressure of the hydraulic fluid in the closing hydraulic cylinders. This hydraulic fluid may have a pressure as high as 2,800 pounds per square inch and exerts a high clamp pressure between the mold parts, which may be as great as 190 tons. The captured parison is then blown in the cavity to form the desired article. After blowing, pressure is maintained in the article during a cooling period required to cool the molded plastic and form a solid shaped article. The cooling period may be as long as a number of minutes, depending upon the shape and thickness of the molded article. After cooling, an air port is opened to reduce the pressure within the molded article, valves 42, 58 and the valves of the high pressure actuation system are closed by the controller and the return hydraulic cylinders are collapsed to open the mold and return the platens and mold parts rapidly to the open position of FIG. 1. Extraction tooling is then extended into the space between the mold parts to engage and remove the molded article, completing a cycle of operation.

The closing control system monitors closing of the platens and stops platen movement if necessary. If the difference between the desired position and the measured position of a platen exceeds a threshold value, closing of the platens is stopped. For instance, if the difference between desired and measured positions of either the master platen or slave platen exceeds the threshold value, the appropriate calculation unit 84, 88 generates a signal conveyed by lead 94 or lead 100 respectively to close blocking valve 36 and stop the platens.

The master-slave control system assures accurate closing of mold parts 16, 18 throughout the production life of the machine. Changes in the hydraulic and mechanical systems may alter the actual closing path of each platen. Should the master platen closing path 106 change slightly over time, the corresponding slave platen closing path 108 automatically adjusts to follow and assures accurate closing of the mold parts. Closing path adjustments made by the master-slave control system are transparent to the operation of the machine and do not require recalibration of the control system.

Accumulator head blow molding machine 10 as illustrated is particularly adapted to blow mold large sized plastic articles having relatively thick walls up to, for instance, 0.375 inches thick. The parison 22 may have a 12 inch diameter, a 6 foot length and a total weight of about 40 pounds. The article molded by machine 10 may have a 6 foot length and exterior diameter of 17 inches or more.

When fully opened, the front faces of the mold may be spaced apart about 48 inches in order to provide sufficient space for extraction tooling to be extended between the mold parts to engage and withdraw the blown article.

The closure of each platen and mold part is controlled by master-slave control system 70. The control system is actuated by a start signal and must very accurately control the closure of the two platens to assure that each platen is accurately moved along a relatively long time/distance path and close properly. The closing path for each platen may be 2 feet long. Very accurate control of closing motion of the platens is required to assure rapid cycling of machine 10 with proper positioning of the platens in the required locations, proper closing of the mold parts on the parison and proper movement of the molds parts to or immediately adjacent the parting plane prior to application of the high pressure clamp force.

Blow molding machine 10 includes closing control system 70 that controls the movement of master platen 12, determines the corresponding desired position of slave platen 14 and controls the movement of slave platen 14 based on the desired and measured locations of the slave platen. The closing paths 106, 108 of each platen may be different from one another and need not to be symmetrical with respect to parting line 24. For instance, the platens can be programmed to meet at a position offset from parting line 24 for molding of non-symmetric parts.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What is claimed is:

1. An accumulator blow molding machine comprising a frame, a master platen and a slave platen, each platen movably mounted on the frame; first and second mold parts on said master and slave platen respectively, recesses in the mold parts defining a mold cavity when the mold parts are closed; an accumulator extrusion head located above the mold parts to extrude a parison between the mold parts; a source of hydraulic fluid; a hydraulic pump for flowing the hydraulic fluid from the source; a master platen drive including a master hydraulic closing cylinder connected to the master platen to move the master platen and said first mold part from an open position to a closed position, said master hydraulic cylinder having a master cylinder extension inlet port, a master hydraulic line extending from said hydraulic pump to the extension inlet port of the master hydraulic cylinder and a master hydraulic control valve in said master hydraulic line; a slave platen drive including a slave hydraulic cylinder connected to the slave platen to move the slave platen and said second mold part from an open position to a closed position, said slave hydraulic cylinder having a slave cylinder extension inlet port, a slave hydraulic line extending from said hydraulic pump to the extension inlet port of the slave hydraulic cylinder and a slave hydraulic control valve in said slave hydraulic line; and a hydraulic cylinder closing control system associated with said master and slave platen drives, said closing system including master and slave linear transducers, each transducer mounted on the frame and connected to the corresponding master platen or slave platen to generate a signal indicating the position of such platen relative to the frame, a controller having a master memory unit to store time/distance closing path information for the master platen, a master calculation unit connected to the memory unit and to the master linear transducer to receive said information about the closing path of the master platen and the master transducer signal and then calculate an output signal for controlling the master hydraulic cylinder, a connection between the master calculation unit and the master hydraulic valve, a master/slave calculation unit connected to the master linear transducer to calculate the desired position of the slave platen from the master transducer signal, a slave calculation unit connected to the master/slave calculation unit and to the slave linear transducer to receive said calculated position and slave transducer signal and then calculate an output signal for controlling the slave hydraulic cylinder, and a connection between the slave calculation unit and the slave hydraulic valve, wherein the master platen is closed along the stored time/distance closing path and the slave platen is closed along a path calculated from the position of the master platen.

2. A machine as in claim 1 including a cycle actuation switch and a connection between the switch and the closing system.

3. A machine as in claim 2 including four hydraulic closing cylinders and a single return hydraulic cylinder connected to each platen.

4. A blow molding machine comprising, a frame; a master platen and a slave platen, each platen movably mounted on the frame; first and second mold parts on said master and slave platen respectively, recesses in the mold parts defining a mold cavity when the mold parts are closed; an extrusion head located to extrude a parison between the mold parts; a master platen drive to move the master platen and first mold part from an open position to a closed position; a slave platen drive to move the slave platen and second mold part from an open position to a closed position; and a closing control system associated with said master and slave platen drives, said closing system including a master transducer operatively connected between the frame and the master platen to generate a signal indicating the position of the master platen relative to the frame and a slave transducer operatively connected between the frame and the slave platen to generate a signal indicating the position of the slave platen relative to the frame, a controller having a master memory unit to store time/distance closing path information for the master platen, a master calculation unit connected to the memory unit and to the master transducer to receive said information about the closing path and the master transducer signal and then calculate an output signal for controlling the master platen drive, a connection between the master calculation unit and the master platen drive, a master/slave calculation unit connected to the master transducer to calculate the desired position of the slave platen from the master transducer signal, a slave calculation unit connected to the master/slave calculation unit and to the slave transducer to receive said calculated position and slave transducer signal and then calculate an output signal for controlling the slave platen drive, and a connection between the slave calculation unit and the slave platen drive, wherein the master platen is closed along the stored time/distance closing path and the slave platen is closed along a path calculated from the position of the master platen.

5. A blow molding machine as in claim 4 wherein one of said master platen drive and slave platen drive includes a hydraulic cylinder, a control valve for flowing hydraulic fluid to the cylinder and a first controller connected to the connection between the control system and said one platen drive for operating the valve of said one platen drive.

6. A blow molding machine as in claim 5 wherein the other of said master platen drive and slave platen drive includes a hydraulic cylinder, a control valve for flowing hydraulic fluid to the hydraulic cylinder of said other platen drive and a second controller connected to the connection between the control system and said other platen drive for operating the valve of said other platen drive.

7. A blow molding machine as in claim 6 wherein said extrusion head comprises a resin accumulator.

8. A blow molding machine as in claim 7 wherein said closing control system includes an actuation switch to initiate closing of the mold platens.

9. A blow molding machine as in claim 8 wherein said mold platens are each moved approximately 2 feet during closing.

10. A blow molding machine as in claim 9 wherein said mold platens contact each other at a parting plane under the extrusion head.

11. A method of blow molding a plastic article using a blow molding machine including a frame, a master platen and a slave platen, each platen movably mounted on the frame, mold parts mounted on the platens, a master platen drive connected to the master platen to move the master platen from an open position to a closed position, a slave platen drive connected to the slave platen to move the slave platen from an open position to a closed position and a parison extrusion head located above the mold parts, comprising the steps of:
  a) positioning the platens in an open position with the mold parts to either side of and below the extrusion head;
  b) actuating the platen drives to move the platens and mold parts from the open position to a closed position with the mold parts engaging each other;
  c) extruding a parison down from the head between the platens before the mold parts are closed and capturing the parison between the closed mold parts;
  d) during closing movement of the platens,
    i) generating a first output signal related to the position of the master platen and to a predetermined time/distance closing path for the master platen;
    ii) controlling the master platen drive in response to the first output signal to close the master platen along the first closing path;
    iii) generating a second output signal related to the position of the slave platen, a predetermined time/distance closing path for the slave platen and the position of the master platen; and
    iv) controlling the slave platen drive in response to the second output signal to close the slave platen along the second closing path;
  e) blowing the captured parison in the closed mold parts to form an article;
  f) opening the mold parts; and
  g) removing the article from between the open mold parts.

12. A method of claim 11 including the step of:
  i) dwelling closing movement of the platens with the mold parts in a preclose position and extruding the parison between the dwelled mold parts prior to closing the mold parts on the parison.

13. A method of claim 12 including the step of:
  j) moving the platens from the open position to the preclose position at a first rate; moving the platens from the preclose position to a nearly closed position at a second rate less than the first rate; and moving the platens closed at a third rate less than the second rate.

14. The blow molding machine as in claim 4 wherein one of said master and slave transducers comprises a linear transducer mounted on the frame and connected to a platen.

15. The blow molding machine as in claim 4 wherein each transducer comprises a linear transducer mounted on the frame and connected to a platen.

16. A blow molding machine comprising a frame; a master platen movably mounted on the frame; a slave platen movably mounted on the frame; a first mold part mounted on the master platen; a second mold part mounted on the slave platen; recesses in the mold parts defining a mold cavity when the mold parts are closed; an extrusion head located to extrude a parison between the mold parts when open; a master platen drive to move the master platen and first mold part from an open position to a closed position; a slave platen drive to move the slave platen and second mold part from an open position to a closed position; a closing control system including a master transducer connected between the master platen and the frame to generate a master platen location signal indicating the position of the master platen relative to the frame, a slave transducer connected between the slave platen and the frame to generate a slave platen location signal indicating the position of the slave platen relative to the frame; an electronic controller including a master memory unit to store time/distance closing path information for the master platen and a master/slave calculation unit to calculate the desired position of the slave platen from the master platen location signal; and connections joining said electronic controller system and said master transducer, said slave transducer, said master platen drive and said slave platen drive, wherein the master platen is closed along the stored time/distance closing path and the slave platen is closed along a path calculated from the position of the master platen.

17. A method of blow molding a plastic article using a blow molding machine including a frame, a master platen and a slave platen, each platen movably mounted on the frame, mold parts mounted on the platens, a master platen drive connected to the master platen to move the master platen from an open position to a closed position, a slave platen drive connected to the slave platen to move the slave platen from an open position to a closed position and a parison extrusion head located above the mold parts, comprising the steps of:
  a) positioning the platens apart in an open position with the mold parts to either side of and below the extrusion head;
  b) closing the platens by actuating the platen drives to move the platens and mold parts from the open position to a closed position with the mold parts engaging each other;
  c) extruding a parison down from the head between the platens before the mold parts are closed and capturing the parison between the closed mold parts;
  d) during closing of the platens,
    i) controlling the master platen drive to move the master platen along a first predetermined time/distance closing path,
    ii) determining the actual location of the master platen relative to the frame,
    iii) controlling the slave platen drive in response to the actual location of the master platen to move the slave platen along a second predetermined time/distance closing path;
  e) blowing the captured parison in the closed mold parts to form an article;
  f) opening the mold parts; and
  g) removing the article from between the open mold parts.

18. The method of claim 17 including the steps of:
  h) additionally controlling the master platen drive according to the actual location of the master platen;
  i) determining the actual location of the slave platen relative to the frame; and
  j) additionally controlling the slave platen drive according to the actual location of the slave platen.

* * * * *

UNITED STATES PATENT AND TRADEMARK OFFICE
CERTIFICATE OF CORRECTION

PATENT NO. : 6,120,712
DATED : September 19, 2000
INVENTOR(S) : Michael C. Chase It is certified that error appears in the above-identified patent and that said Letters Patent is hereby corrected as shown below:

Title page item [56],

In the References Cited - OTHER PUBLICATIONS
INID Code [56], References Cited, OTHER PUBLICATIONS, line 1, following "MACRO®EZ" insert --PRO--; line 2 change "Barker-Colman" to --Barber-Colman--.

Signed and Sealed this

Twenty-fourth Day of April, 2001

*Attest:*

NICHOLAS P. GODICI

*Attesting Officer*   Acting Director of the United States Patent and Trademark Office